US008424026B1

(12) United States Patent
Cottrell

(10) Patent No.: US 8,424,026 B1
(45) Date of Patent: Apr. 16, 2013

(54) EXECUTION OF APPLICATIONS DISTRIBUTED ACROSS A PLURALITY OF COMPUTING DEVICES

(75) Inventor: John C. Cottrell, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 13/251,538

(22) Filed: Oct. 3, 2011

(51) Int. Cl.
*G06F 13/00* (2006.01)

(52) U.S. Cl.
USPC .......................................... 719/330; 709/245

(58) Field of Classification Search .................. 719/330; 709/245
See application file for complete search history.

(56) References Cited

U.S. PATENT DOCUMENTS

| | | | |
|---|---|---|---|
| 7,228,359 B1 | 6/2007 | Monteiro | |
| 7,249,374 B1 | 7/2007 | Lear et al. | |
| 7,376,827 B1 | 5/2008 | Jiao | |
| 7,499,998 B2 | 3/2009 | Toebes et al. | |
| 7,543,020 B2 | 6/2009 | Walker et al. | |
| 7,660,901 B1 | 2/2010 | O'Toole, Jr. et al. | |
| 8,078,759 B2 * | 12/2011 | Seifert et al. | 709/246 |
| 2003/0055875 A1 | 3/2003 | Carter | |
| 2007/0226294 A1 | 9/2007 | Pruitt et al. | |
| 2009/0094312 A1 * | 4/2009 | Powley et al. | 709/203 |

OTHER PUBLICATIONS

Secure Shell—Wikipedia, pp. 1-8, retrieved from the internet on Oct. 3, 2011.
The GNU Netcat, pp. 1-2, retrieved from the internet on Oct. 3, 2011.
CryptCat Project, p. 1, retrieved from the internet on Oct. 3, 2011.
Socat-Multipurpose relay, pp. 1-3, retrieved from the internet on Oct. 3, 2011.
NSH, pp. 1-2, retrieved from the internet on Oct. 3, 2011.
DNS Service Discovery, pp. 1-4, retrieved from the internet on Oct. 3, 2011.
SRV record, pp. 1-4, retrieved from the internet on Oct. 3, 2011.
BPEL Source, 1 page, retrieved from the internet on Oct. 3, 2011.
6.10 The Restriction Shell, 1 page, retrieved from the internet on Oct. 3, 2011.
Socat, pp. 1-47, Jan. 2010.
International Search Report and Written Opinion in counterpart International Application No. PCT/US2012/058278, mailed Feb. 22, 2013, 10 pages.

* cited by examiner

*Primary Examiner* — Andy Ho
(74) *Attorney, Agent, or Firm* — Edell, Shapiro & Finnan, LLC

(57) ABSTRACT

According to one embodiment, a system comprises at least one processor. The system detects on a computing device an invocation event facilitating execution of one or more applications. The applications include at least one remote application. A search path is examined to determine locations for the one or more applications, and includes at least one indicator indicating a remote location for execution of a corresponding remote application. Each indicator associated with the at least one remote application is resolved to determine a remote location for execution of the corresponding remote application. The applications are executed at the determined locations with each remote application being executed on a corresponding remote computing device at the corresponding remote location. Embodiments may further include a method and computer-readable media encoded with software for executing applications distributed across a plurality of computing devices in substantially the same manner described above.

27 Claims, 5 Drawing Sheets

EXECUTION OF APPLICATIONS DISTRIBUTED ACROSS A PLURALITY OF COMPUTING DEVICES

TECHNICAL FIELD

The present disclosure relates to execution of applications and, more specifically, to execution of various applications distributed locally and remotely from the location of the application invocation and across a plurality of computing devices.

BACKGROUND

Distributed processing frameworks (e.g. CORBA, DCOM, .NET, EJB, JINI, Javaspaces, Web Services, etc.) attempt to coordinate functional execution of applications across an environment of connected computing devices. However, as distributed processing frameworks mature, the frameworks become increasingly prohibitive for use by an application developer or administrator due to complexity of the coding of the application itself, or of the framework to which the application delegates tasks. For example, application servers typically take minutes to start, load tens or hundreds of thousands of classes, and consume hundreds of megabytes of memory before performing a single application transaction.

Distributed processing frameworks typically consume resources constantly (e.g., whether or not the frameworks are performing any useful work), and tend to be either technology-specific to the application and supporting services (e.g. .NET or any of the Java variants) or technology-agnostic but requiring multiple technology-specific implementations (e.g. CORBA, X-Window). The technology-specific nature of distributed processing framework implementations can be a constraint to the adaptability of a framework to existing applications, or a barrier to integration with new application programming languages and emerging tools.

DESCRIPTION OF EXAMPLE EMBODIMENTS

Overview

Figure 1:
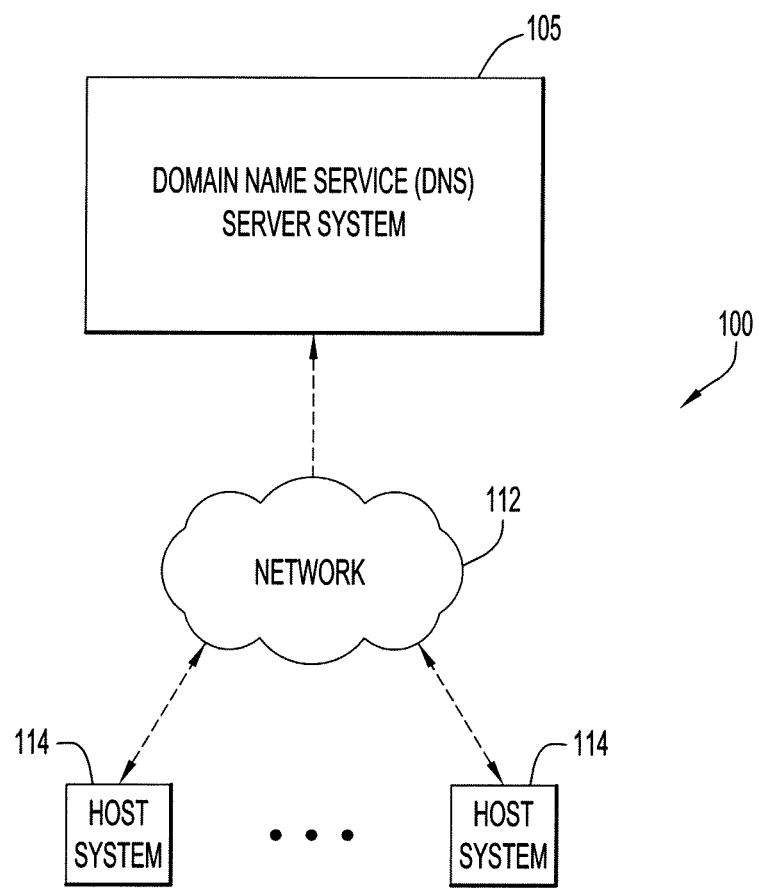
FIG. 1 is a diagrammatic illustration of an example topology for a present embodiment.

According to one embodiment, a system comprises at least one processor. The system detects on a computing device an invocation event facilitating execution of one or more applications. The applications include at least one remote application each for execution on a corresponding remote computing device. A search path is examined to determine locations for the one or more applications. The search path includes at least one indicator each associated with a corresponding remote application and indicating a remote location for execution of the corresponding remote application. Each indicator associated with the at least one remote application is resolved to determine a remote location for execution of the corresponding remote application. The one or more applications are executed at the determined locations with each remote application being executed on the corresponding remote computing device at the corresponding remote location. Embodiments may further include a method and computer-readable media encoded with software for executing applications distributed across a plurality of computing devices in substantially the same manner described above.

Example Embodiments

Embodiments described herein are directed to a distributed processing interface for managing functions used for distributed processing of applications residing on any combination of devices employing a compatible network-accessible operating system. Further, various value-added capabilities may be overlaid on this functionality. Present embodiments create the effect from the perspective of a developer and/or application of a cloud-enabled operating system, where any application invoked on any computing device is dynamically discovered anywhere globally within a network and executed. Present embodiments provide an interface between an operating system and application, and transparently execute an application no matter where the application resides (as if the application were local). The interface may receive and process commands or instructions from code (e.g., programs, scripts, macros, etc.) or, alternatively, be in the form of a shell to receive and process commands or instructions from a user. In addition, applications may be combined or dispatched dynamically to execute in optimal locations (or on computing devices with optimal available resources) in an agent paradigm.

The distributed processing interface of present embodiments provides several advantages. In particular, the distributed processing interface dynamically locates one or more local or remote applications, and executes the applications in a defined workflow. Further, the distributed processing interface manages all communication between the applications, enforces security for both the application and communications, and releases all allocated resources upon completion. The distributed processing interface may be agnostic to the application technology and the data exchange protocol, and does not intrude upon the application code. Moreover, the distributed processing interface acts as an intermediary between the application and the operating system (and/or network) to apply various value-added capabilities. The distributed processing interface may be implemented as a shell for interaction with a user or, alternatively, be embedded within, or tightly integrated with, the operating system (e.g., an executable library, etc.).

The distributed processing interface of present embodiments modifies an execution path (e.g., indicated by a PATH command or environment variable (e.g., $PATH)) to include Domain Name Service (DNS-SD) lookups as part of service location. For example, the following commands entered at a shell prompt ("nsh>") of a distributed processing interface embodiment:

nsh>export PATH=/bin;/usr/bin;myapps.domain.com
nsh>hello_world, are processed by searching the "/bin" and "/usr/bin" directories for an executable file for an application (e.g., a file containing code for an application in a form causing a computer system to perform tasks (e.g., typically machine code for a physical processor)) called "hello_world" providing the desired service. When the application does not reside within these directories, a Domain Name Service (DNS) lookup is provided for "hello_world.myapps.domain.com." If an Internet Protocol (IP) address is returned from that lookup (e.g., regardless of whether the DNS lookup is a result of load-balancing, clustering, fail-over, etc.), the application or service location is considered successful. The precedence of locating remote and local applications is controlled by the sequence of directives in the search path (e.g., indicated by a PATH or other command or $PATH or other environment variable). The capability to include the DNS name of the services or computing devices to be searched within the search path enables the location of the service (whether local or on a remote computing device) to be implicit, transparent, automatic, and prioritized using the ordering of entries in the search path.

If the application is located remotely, the distributed processing interface incorporates secure remote execution capabilities to establish a secure connection to the remote host system (e.g., via any conventional or other security techniques), execute the remote application, and pipeline the output back to the distributed processing interface. The architecture at the remote host system employs an analog of these capabilities, where a process manager daemon receives a request for application execution and initiates (or forks) a process to locate and execute the application on the remote host system.

The distributed processing interface incorporates the transparent service location and execution with pipelining of input and output between commands or instructions (e.g., the output of one application serves as the input to the next application). For example, with respect to the following command entered at a shell of a present embodiment (e.g., "|" indicating pipelining):

nsh>cat input.txt|appx|appy|appz>output.txt, the distributed processing interface executes and produces the local output regardless of where the applications (e.g., appx, appy, and appz) reside (e.g., on any network-accessible device containing the remote daemon, including mobile devices that have registered their services in DNS). The shell transparently pipelines the workflow between applications, and may apply value-added directives (e.g., encryption and compression to optimize and secure the communication).

In a present embodiment, shell built-in commands and directives can be seamlessly mixed with applications regardless of the application technology or location of the application. Further, programming and scripting involving seamless inclusion of distributed commands or instructions in complex procedural logic and dynamic command substitution is supported regardless of the location of the applications as referenced by their name registered in DNS.

The DNS registration aspect of present embodiments enables the service registration and location to occur entirely at no higher than Layer 3 (e.g., network layer) of the Open Systems Interconnection (OSI) stack, and at any location globally using DNS federation, redundancy, and resiliency features in a protocol-agnostic manner. DNS registration of applications may be based on Application Programming Interface (API) calls or automated manners of auto-registration (e.g., per-execution updates (e.g., the application resides on a particular computing device at a given moment), scans of defined directories to register all applications on that system, etc.).

The applications are not required to have any knowledge or code to implement the distributed processing or communication other than the ability to implement the near-universal read and write functionality of standard input, standard output, and standard error interfaces. For example, directives may be applied inline with command substitution, within code instructions, as environment variables, or as command line arguments.

Accordingly, present embodiments provide application technology-agnostic service location and registration (e.g., including self-registration by applications), seamless local and remote command or instruction execution (e.g., including mobile code moving dynamically between host operating environments based on a defined set of criteria (e.g., distributed processing interface agents may be directed to transport and execute the application to whichever computing device has higher capacity or lower latency (e.g., a 5 Megabyte application that is dynamically sent to a location to process 5 Gigabytes of data then returns with a state intact to avoid the latency of moving the data across the network to where the application first was located), etc.)).

Further, present embodiments provide transparent, non-intrusive, and application technology-agnostic: use of value-added options for optimizing and securing distributed communication between applications (e.g., encryption, compression, quality-of-service, clustering, security, etc.); tracking, metrics, utilization, capacity, and dependency management insight collected at the point of service execution and the granularity of the service; and dynamic workload management and orchestration based on any combination of declarative, programmatic, or dynamic metrics-driven criteria driven by the services themselves at the point of execution, where communication is orchestrated in variations of local, remote, synchronous, or asynchronous execution.

Moreover, present embodiments may perform the above functions within a cloud environment in which any IP-addressable device may participate as both a client and a server service provider that may be changing physical or virtual locations at any time (e.g., including mobile devices or applications that are dynamically registering themselves with the DNS service registry through the distributed processing interface of present embodiments). An execution model is employed that allows for additional models of asynchronous Web processing beyond request blocking for a response between applications.

Present embodiments may act as an intermediary between the application and the operating system (and/or the network) to apply directives controlling, tracking, reporting, and optimizing communication and any number of additional aspects of process execution (e.g., utilization, security credentials, optimized routing, quality of service including complete and accurate dependency insight reporting of interdependencies between applications, etc.). Further, present embodiments integrate the application functionality with network capabilities without intruding on the application itself (e.g., including the ability to leverage hardware capabilities in network devices without requiring API interfaces within the applications). For example, an encryption or compression co-processor may be employed transparently for the applications when pipelining data between the applications through the distributed processing interface.

In addition, present embodiments may secure the execution context incorporating a limitation on features available to the application context, thereby reducing the risk of mobile code. Moreover, any application written in any programming technology may inherit the distributed processing capabilities of the shell of a present embodiment simply by executing within the distributed processing interface. Accurate business intelligence on usage patterns between clients and services consumed is generated by capturing the dependency at the DNS registry and both endpoints of client and server without the typical need to decrypt the URL or intrude upon the application. New application patterns are established for bringing together or dispatching applications dynamically to perform a task based on a set of declarative, programmatic, or dynamically determined criteria.

Present embodiments combine various features to provide the above capabilities including a technology-agnostic service registry and location broker based on DNS (e.g., capabilities for global federation, scaling, redundancy, resiliency, etc.), a remote execution daemon to manage network-enabled interfaces in which applications are executed, network-enabled interface processes to serve as execution environment intermediaries between the application and the operating system, the network, and each other, and value-added services overlaid onto the network-enabled interface that the application inherits transparently (e.g., encryption, compression, dependency tracking, Quality of Service (QoS), service location, service registration, etc.).

Present embodiments may be implemented by various components including an operating system, software executables or libraries (e.g., providing a distributed processing controller, applications, a process manager, etc.), configuration file, Domain Name Service (DNS), one or more computing devices, an ethernet network (e.g., typically including access and service switches, cabling or wireless connectivity, and a network operating system), and one or more storage devices capable of storing and accessing the above software by virtue of interaction with the computing devices and operating systems. The distributed processing interface of present embodiments is generally responsive to an invocation event for an application.

An example topology for a present embodiment is illustrated in FIG. 1. Specifically, topology 100 includes a Domain Name Service (DNS) server system 105 and one or more host systems 114. DNS system 105 processes queries to provide location information (e.g., IP or other network addresses, locations, etc.) associated with applications. DNS system 105 and host systems 114 may be remote from each other and communicate over a network 112. The network is preferably an ethernet network typically including access and service switches, cabling or wireless connectivity, and a network operating system. However, the network may be implemented by any number of any suitable communications media (e.g., wide area network (WAN), local area network (LAN), Internet, Intranet, ethernet, etc.). Alternatively, DNS system 105 and host systems 114 may be local to each other, and communicate via any appropriate local communication medium (e.g., local area network (LAN), hardwire, wireless link, Intranet, etc.).

Host systems 114 may include one or more applications, and enable execution of local and remote applications on one or more of host systems 114 from a distributed processing interface as described below. Host systems 114 include various modules to facilitate execution of applications distributed across the host systems as described below. Host systems 114 may present a graphical user (e.g., GUI, desktop, etc.) or other user interfaces (e.g., command line prompts, menu screens, etc.) to solicit information or commands for performing desired actions (e.g., invoking local or remote applications, etc.).

Host systems 114 may be implemented by any conventional or other computer systems preferably equipped with a display or monitor, a base (e.g., including a processor 270 (FIG. 2), memories 280, and/or internal or external communications devices or network interfaces 260 (e.g., modem, network cards, etc.)), optional input devices (e.g., a keyboard, mouse or other input device), and any commercially available and/or custom software (e.g., communications software, distributed processing controller and process manager modules, etc.). Alternatively, host systems 114 may further be implemented by any type of computer or processing device (e.g., laptop, personal digital assistant (PDA), mobile/cellular telephone devices, mobile devices (e.g., pads or tablets), etc.). Further, DNS system 105 may be implemented by any conventional or other computer systems preferably equipped with a display or monitor, a base (e.g., including a processor, memories, and/or internal or external communications devices or network interfaces (e.g., modem, network cards, etc.)), optional input devices (e.g., a keyboard, mouse or other input device), and any commercially available and/or custom software (e.g., communications software, DNS software, etc.).

Figure 2:
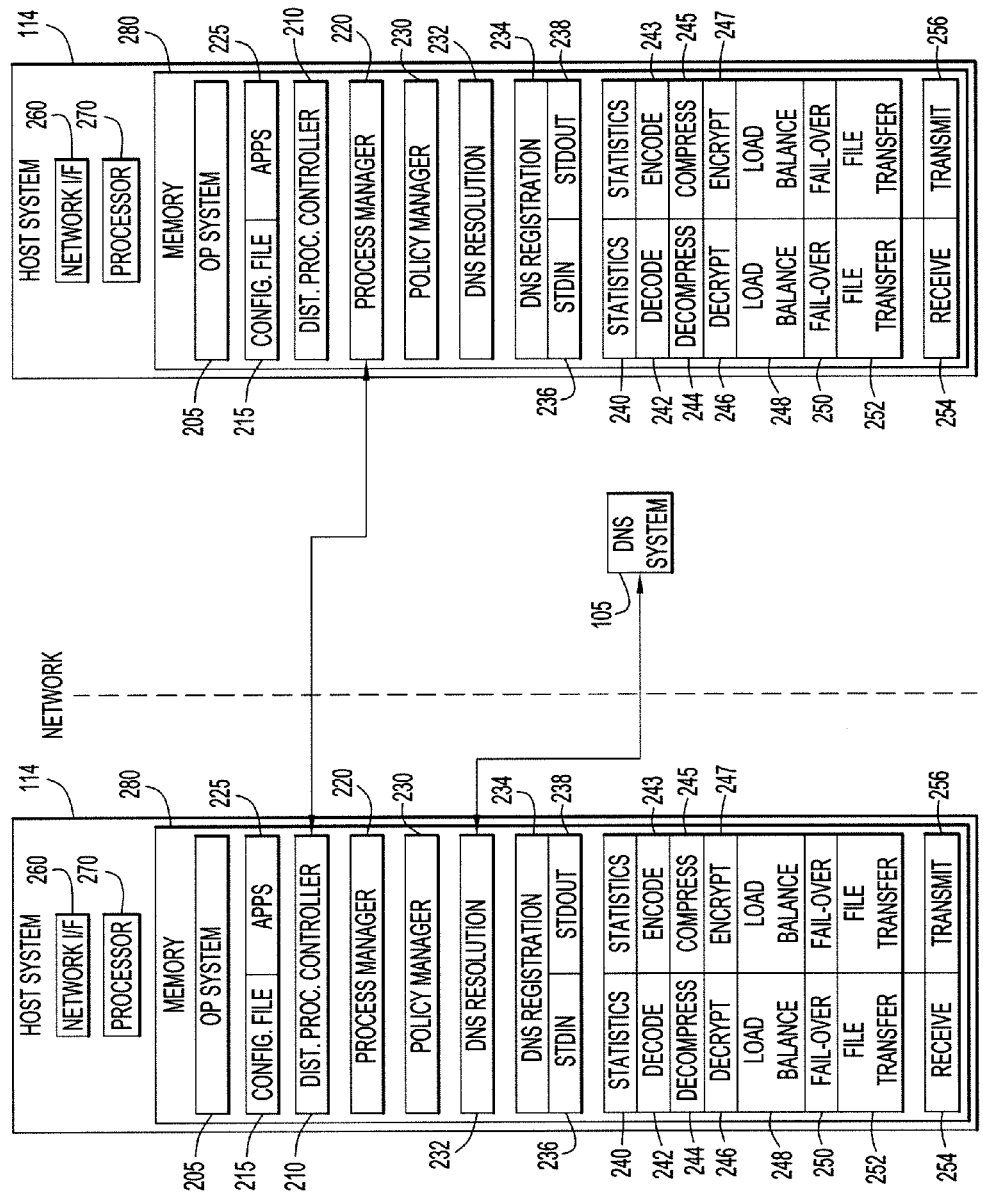
FIG. 2 is a block diagram of a host system with modules for providing a distributed processing interface according to an embodiment.

Host systems 114 include various modules to execute applications distributed across the host systems as illustrated in FIG. 2. Specifically, host system 114 includes an operating system 205, a distributed processing controller module 210, a process manager module 220, and a DNS resolution module 232. Operating system 205 may be implemented by any conventional or other operating system, wherein host systems 114 may each include the same or different operating systems. Distributed processing controller module 210 (e.g., via host system 114) provides the user interface for the shell. The distributed processing controller module (e.g., via host system 114) further parses the commands or instructions (e.g., from the shell or code), facilitates service location to find the applications specified within the commands or instructions among host systems 114, and pipelines or directs data between the specified applications as described below.

Further, the distributed processing controller module may be associated with a number of pluggable service modules selectively utilized to perform externalized services. The distributed processing controller module passes a request through a series of these pluggable service modules to perform various services on data for and/or from applications. Any quantity of the service modules may be placed in sequence for operation on the data. Each pluggable service module may be configured using external environment variables, command-line arguments, or property files without intruding upon the applications.

The pluggable modules may include: policy manager 230 providing workload management policies relying on external services to determine an optimization policy based on available capacity; and a DNS registration module 234 to dynamically register applications on host system 114 with DNS system 105. In addition, various pluggable modules may be associated with standard input (stdin 236), output (stdout 238), and error streams (stderr, not shown) to enable services to be applied to data for and/or from the applications. These various pluggable modules may include: a statistics module 240 to provide statistics concerning host system or application operation (for standard input 236 and output 238); an encode module 243 to encode outgoing data (for standard output 238); a decode module 242 for decoding encoded incoming data (from standard input 236); a compress module 245 to compress outgoing data (for standard output 238); a decompress module 244 to decompress compressed incoming data (from standard input 236); an encrypt module 247 to encrypt outgoing data (for standard output 236); a decrypt module 246 to decrypt incoming encrypted data (from standard input 236); a load balance module 248 to balance processing loads (for standard input 236 and output 238); a fail-over module 250 to perform actions in response to failures (for standard input 236 and output 238); and a file transfer module 252 to accommodate file transfers (e.g., migration of applications or other data) (for standard input 236 and output 238). Data for applications may be pipelined by directing data from standard output 238 of one application (e.g., via transmit module 256) to standard input 236 of another application (e.g., via receive module 254).

These services may be performed by a host system 114, or be off-loaded to and performed by an external processor. In particular, each pluggable service module may act as an interface to delegate functionality to an external resource (e.g., a host system, network device or service, etc.). For example, a service module may communicate with a network device or a co-processor card to perform a task (e.g., encryption, load-balancing etc.).

DNS resolution module 232 provides assistance with service location, and communicates with DNS system 105 to provide location information (e.g., IP or other addresses, locations, etc.) for applications. Process manager module 220 is preferably in the form of a daemon, and handles (e.g., via host system 114) various tasks including requests to execute applications from other host systems 114, and performing scans of the host system to dynamically register applications discovered on the host system. The process manager module receives a request for application execution, and initiates (or forks) a process for execution of the distributed processing controller module to perform (e.g., via host system 114) the application execution. Host system 114 may further include within memory 280 a configuration file 215 providing parameters for service location (e.g., search paths, etc.) as described below, and one or more applications 225 for local or remote execution by the host systems.

The various modules (e.g., distributed processing controller module, process manager module, DNS resolution module, pluggable service modules, etc.) may be implemented by any combination of any quantity of software and/or hardware modules or units, and may reside within memory 280 of the host systems for execution by processor 270.

Figure 3:
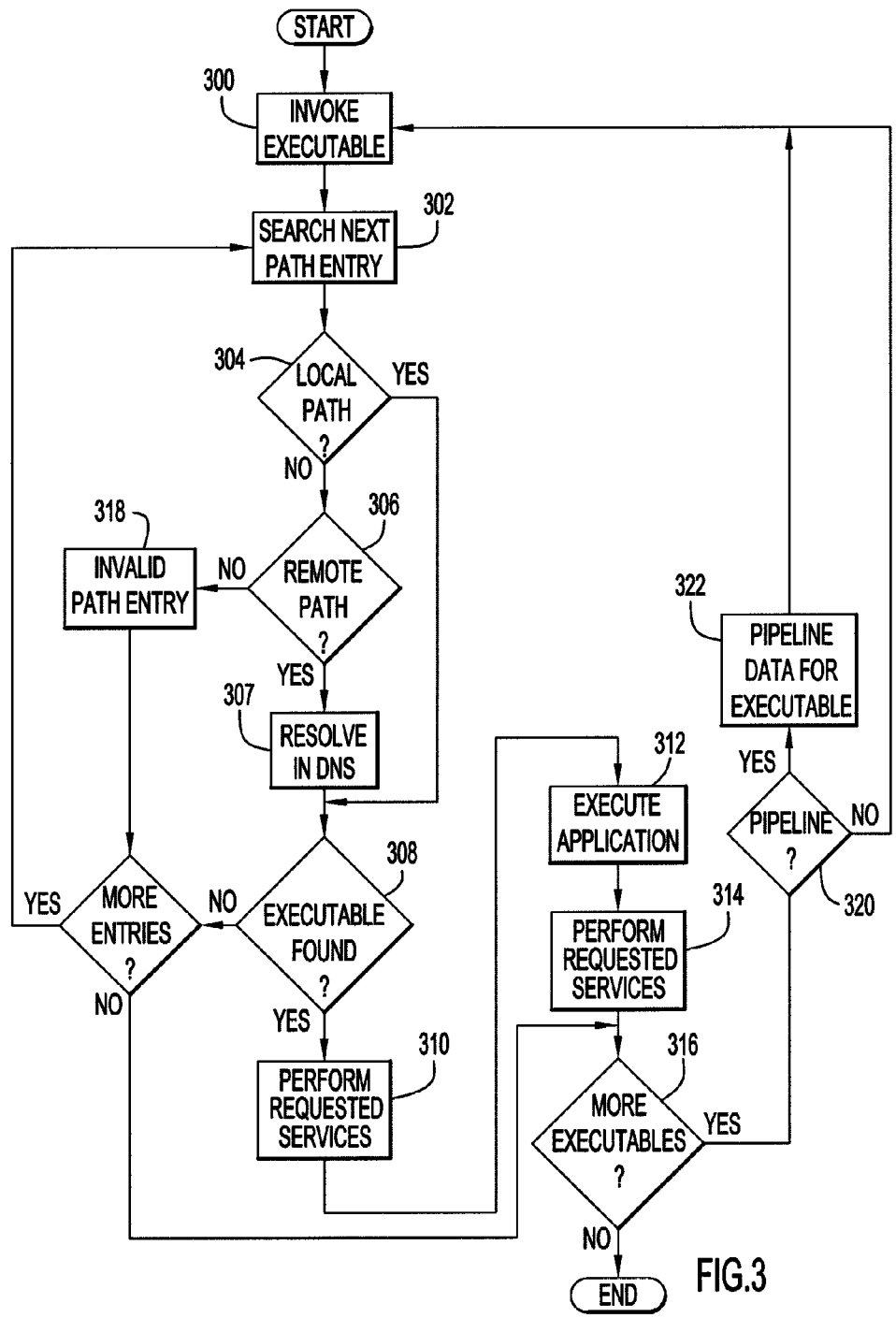
FIG. 3 is a procedural flowchart illustrating a manner in which example applications distributed across a plurality of host systems are executed according to an embodiment.

A manner in which applications distributed across host systems 114 are executed according to a present embodiment is illustrated in FIG. 3. Initially, the distributed processing interface of a present embodiment enables application execution to be agnostic relative to the location of an application on a particular operating system or computing device (e.g., host system 114). The application execution occurs transparently, whether the application is local or remote to the invocation, thereby creating the opportunity to provide optimizations or services. In particular, an application is invoked at step 300. This may be accomplished by a command within code (e.g., program, script, macro, etc.), or entered into the shell of a present embodiment, directing execution of one or more specified applications.

Once the command is received, an entry (e.g., PATH command or other entry) within configuration file 215 that provides a search path or, in other words, directives for locating the applications specified within the received command is analyzed by distributed processing controller module 210 (e.g., via host system 114) at step 302. This use of a search path enables the transparency for execution of local and remote applications. The resolution of the location of the applications in the search path combines the prioritized sequential search of directories for the executable file of the application with a remote network naming service to enable the application to be located in a manner that is agnostic to the presence of the application either local to the mounted file systems of the invoking operating system, or on a remote resource on a computer network. This integration of a network naming and location service into the search path (e.g., PATH or other entry) may be applied to any type of network naming service that returns an addressable location from which remote execution can be initiated and completed by the distributed processing controller module coordinating with the remote resource.

The fully-resolved path entry includes a structure that combines local and/or remote references in the desired priority sequence, and the distributed processing controller module resolves and executes the application in any or all of the locations depending on the configured policy. An example entry for a search path may include the following:

PATH=[local reference];[remote reference], where the remote reference may be any suitable convention for indicating a location of a remote service (e.g., URLs, IIOP global identifiers, RMI references, DNS names, etc.). Further, any part of the entry (e.g., PATH or other entry) may support substitution. In this case, portions of the path entry may be abstract references to other sources of configuration information (e.g., environment variables, inline scripting to source a resource (e.g., a URL or configuration file, etc.), etc.) as shown in the following example entries.

PATH=[local reference];$REMOTE_REFERENCES
PATH=[local reference];'get_remote_references'
PATH=[local reference];'http://[host.domain]/remote_references'
PATH=[local reference];'file:///remote_references'.

The resolution of the location of the executable file for an application in the search path may use the prefix of the Domain Name Service name to identify the application being invoked in the sequentially prioritized search path. This enables the application to be resolved to targets at a level not higher than Layer 3 (e.g., network layer) of the Open Systems Interconnect (OSI) model. An advantage of resolving the application to one or more IP addresses no higher than Layer 3 (e.g., network layer) in the Open Systems Interconnect (OSI) model includes the target execution host system being resolved to one or more global locations without proxies or redirects. This is useful for global load balancing and failover without complexity at the target hosts, but also to locate stateful applications that may be frequently changing locations.

The application in the integrated search path resolves to one or more Internet Protocol (IP) addresses by the Domain Name Service (DNS) that are available to the distributed processing controller module as execution target host systems to satisfy the invocation. The remote DNS reference in the integrated search path may have several configurations that fully resolve the ("application.host.domain") reference. An example for a fully qualified reference includes the following:

PATH=[local reference];[application.host.domain].

An example of implicit substitution for the executable file name of an application includes the following:

PATH=[local reference];[$application executable name] [host.domain].

The distributed processing controller module (e.g., via host system 114) identifies local directories or paths within the search path. If local directories are identified as determined at step 304, the identified local directories are searched for the specified application at step 308. If the application is not found within the identified local directories, the next search path entry is retrieved at step 302 and analyzed as described above in response to the presence of additional search path entries as determined at step 324. When no additional search path entries are present, the next application is invoked at step 300 in response to the presence of additional applications as determined at step 316.

When the application is found within the identified local directories as determined at step 308, the distributed processing controller module (e.g., via host system 114) determines the presence of specified services to be performed. The services may be specified by directives within the received command, and performed before and/or after execution of the application. The resolution and execution of applications enables services (e.g., optional optimizations or enhancements) to be applied to intercepted data streams of input and output of each application, and to the integrated combination as a whole. These services may be implemented using pluggable service modules (e.g., software modules or a software library), or interface conventions to external services as described above. The services may include encryption, compression, encoding (e.g., XML), Quality of Service (QoS), transaction control, statistics, logging, debugging/tracing, load-balancing, fail-over, file transfer, dynamic DNS registration, and policy enforcement.

For example, the pluggable service modules (e.g., file transfer module 252 (FIG. 2)) may be used to transfer and/or copy application files and data to a location (e.g., host or other processing system) that provides optimal capability to place application functionality dynamically within the network on any device as part of the invocation sequence of operations. Further, the pluggable service modules (e.g., DNS registration module 234 (FIG. 2)) may be used to register and/or re-register an application in the Domain Name Service (DNS) by scanning local directories on the operating system of the invoking host system, or re-registering the location of transferred/copied applications files at their new location as part of the sequence of actions at the conclusion of a successful application transfer. The dynamic registration or re-registration includes automatic and programmatic re-registration of participating applications (e.g., executable files of the applications) wherever they initially reside, or dynamically move as a result of dynamic invocation or deployment. For example, the process manager module or daemon on each host system 114 (e.g., via DNS registration module 234) registers or re-registers the set of executable files for applications within a defined set of directories, or any incoming executable files for applications that arrive at the host system as a result of their processing directives. This enables "agent" executable files carrying the agent state to be dynamically found as the agent executable files move from system to system performing work.

In addition, the pluggable service modules (e.g., policy manager module 230 (FIG. 2)) may provide a policy engine to govern the invocation and/or services based on rules indicating when and/or the manner the invocation is to occur and the services that are to be applied.

Accordingly, the distributed processing controller module (e.g., via host system 114) generates requests for the pluggable service modules to perform the corresponding specified services prior to execution of the application at step 310. A child process is initiated, and the local application is subsequently executed at step 312. Any services requested after execution of the application are performed at step 314.

If local directories are not identified as determined at step 304, the distributed processing controller module (e.g., via host system 114) identifies within the search path a corresponding DNS name for the application specified in the command. In other, words, the distributed processing controller attempts to identify a remote location for the application. When the corresponding DNS name is not identified as determined at step 306, an invalid entry path notification is provided at step 318 by the host system (since the application has not been identified as either local or remote). The next search path entry is retrieved at step 302 and analyzed by the distributed processing controller module (e.g., via host system 114) as described above in response to the presence of additional search path entries as determined at step 324. When no additional search path entries are present, the next application is invoked at step 300 in response to the presence of additional applications as determined at step 316.

If the corresponding DNS name is identified as determined at step 306, the distributed processing controller module employs DNS resolution module 232 (e.g., via host system 114) to generate a request to DNS system 105 to provide address or other location information for the DNS name indicating the location of the remote host system containing the application at step 307. The DNS system processes and provides a response to the request. The presence of the location information within the response indicates that the specified application may be found.

When the application is found as determined at step 308, the distributed processing controller module (e.g., via host system 114) determines the presence of specified services to be performed. The services may be specified by directives within the received command, and performed before and/or after execution of the application. The distributed processing controller module (e.g., via host system 114) generates requests for the pluggable service modules to perform the corresponding specified services prior to execution of the application at step 310. A request to execute the specified application is generated by the distributed processing controller module (e.g., via host system 114) and transmitted to the remote host system containing the application based on the location information. Process manger module 220 of the remote host system processes the request to execute the specified application at step 312. Specifically, the request includes an identification (e.g., name, etc.) of the desired application. The process manager module of the remote host system initiates (or forks) a process for the remote distributed processing controller module (e.g., via remote host system 114) to determine the location of and execute the application. The application is executed in substantially the same manner described above for executing a local application, where search path entries are analyzed to determine the location of the application, and a process is initiated to execute the application locally on the remote host system. The resulting data from the application execution is transmitted to the host system invoking the application, and any services requested after execution of the application are performed at step 314. Alternatively, the remote host system may be informed of and perform the requested services, and transfer the resulting data back to the host system invoking the application.

Once the application is executed (locally or remotely) and requested services are performed, the presence of additional applications is determined by the distributed processing controller module (e.g., via host system 114) at step 316. The resolution and execution of applications (e.g., via the PATH or other entries) described above enables pipelined input, output, and error streams of the applications to be transparently applied to a combination of local and remote execution of applications. This enables the capability of applications that are distributed or changing locations to be rapidly and dynamically combined. Input (e.g., file, literal, etc.) for an initial (local or remote) application (standard input) may be specified in the command, while the standard output and error from a final (local or remote) application are returned to the distributed processing interface (e.g., for display, etc.). Accordingly, if additional applications exist and data between applications is to be pipelined as determined at step 320, the resulting data from the application execution is used for execution of the next application at step 322, and the next application is invoked at step 300 as described above. The above process is repeated until each application is processed as determined at step 316.

Figure 4:
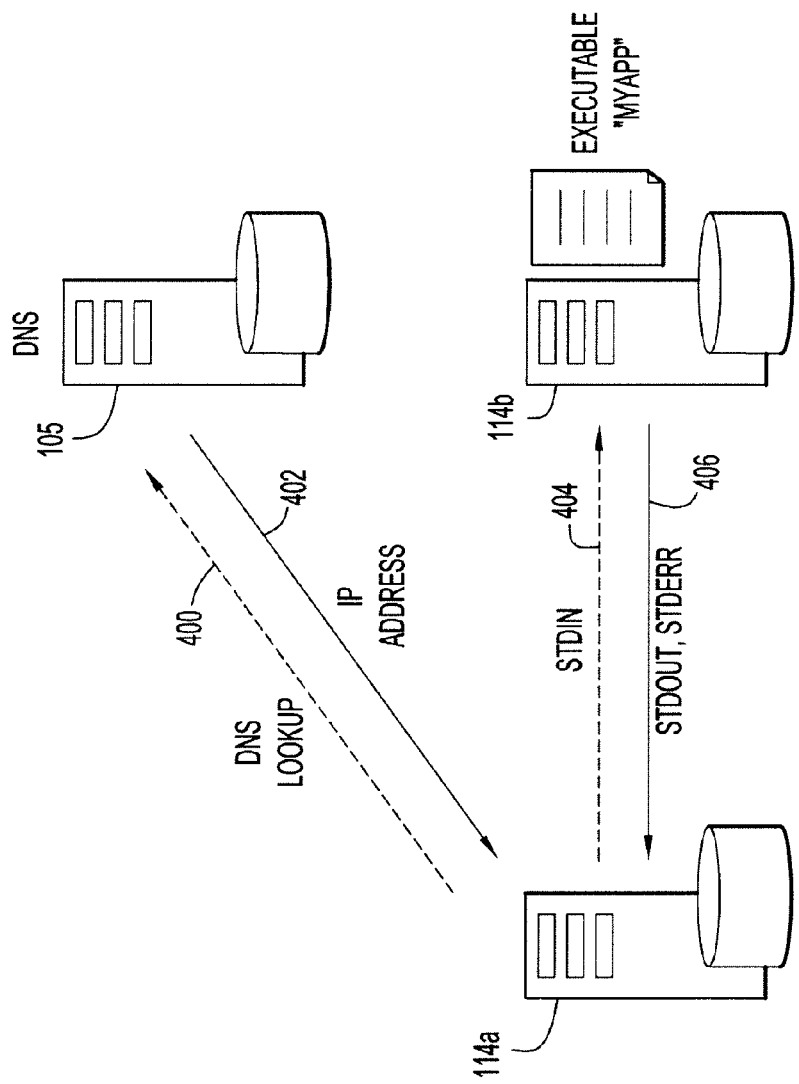
FIG. 4 is a flow diagram illustrating execution of an example remote application according to an embodiment.

Operation of a present embodiment to execute an application contained on a remote host system is illustrated, by way of example, in FIG. 4. Initially, host systems 114*a*, 114*b* are each substantially similar to host system 114 described above, while DNS system 105 is substantially similar to the DNS system described above. Host systems 114*a*, 114*b* may include the same or different operating systems 205, while host systems 114*a*, 114*b* and DNS system 105 are preferably coupled by a network (not shown in FIG. 4). Host system 114*a* may provide the shell of a present embodiment, and invoke the application in response to commands. DNS system 105 performs the name resolution, while host system 114*b* contains and executes the application.

In particular, an invocation event occurs (e.g., user entered command, instruction or command from a program, etc.) on host system 114*a*. By way of example, the following path entry may reside in configuration file 215 (FIG. 2) of host system 114*a*:

path=/usr/bin;myapp.mydomain.com, while the following commands may be entered at a shell prompt:

nsh>echo "input"|myapp nsh>output.

The entered command facilitates execution of an application by the corresponding name of the executable file (e.g., "myapp"), and is processed by distributed processing controller module 210 (e.g., via host system 114*a*). The distributed processing controller module (e.g., via host system 114*a*) locates and executes application "myapp", while passing input data (e.g., "input") from the invocation event and returning output response ("output"). The distributed processing controller module (e.g., via host system 114*a*) ascertains information from configuration file 215 (FIG. 2) including the path locations to search for the application. The distributed processing controller module (e.g., via host system 114*a*) searches the path locations specified by the configuration file in the order of priority determined by the structure in the configuration file (e.g., typically implicit in the sequence of locations, optionally specified in priority by a separate data value, etc.). An example path may include /bin;/usr/bin;myapp.mydomain.com.

When the path locations do not use a qualified DNS name (e.g., "/usr/bin"), the distributed processing controller module (e.g., via host system 114*a*) searches the local directory structure of storage devices of, or mounted to, the operating system of host system 114*a* for the application. If the executable file for the application ("myapp") is found in the directory structure of the storage devices in accordance with the path (e.g., "/usr/bin/myapp"), a child process is spawned on the local operating system to execute the application. In this case, the input data (e.g., "input") is supplied to the standard input (e.g., stdin) of the child process (or application). A response is provided to the distributed processing controller module from the child process.

With respect to the example of FIG. 4, the distributed processing controller module encounters a qualified DNS name (e.g., "myapp.mydomain.com") during the search for the application (e.g., "myapp") through the path entries in order of priority in the configuration file, and a DNS lookup is performed by the configured DNS service or DNS system 105 at flow 400. DNS system 105 provides a Domain Name Service (DNS) that associates the qualified name (e.g., "myapp.mydomain.com") with the Internet Protocol (IP) address assigned to the operating system on host system 114*b*. The IP address corresponding to the qualified name is returned at flow 402. The distributed processing controller module (e.g., via host system 114*a*) sends a request and input data (e.g., "input") to host system 114*b* based on the returned IP address at flow 404. Process manager module 220 (FIG. 2) of host system 114*b* receives and processes the request (e.g., including an identifier (e.g., name, etc.) for the desired application), and initiates (or forks) a process for the remote distributed processing controller module (e.g., via remote host system 114*b*) to determine the location of and execute the application. The application is executed in substantially the same manner described above for executing a local application, where search path entries are analyzed to determine the location of the application, and a process is initiated to execute the application locally on host system 114*b*. In this case, the input data (e.g., "input") received from host system 114*a* to execute the application ("myapp") is supplied to the standard input (e.g., stdin) of the process (or application). A response including the output and error information (e.g., stdout and stderr) from the application is provided from host system 114*b* to host system 114*a* at flow 406.

Figure 5:
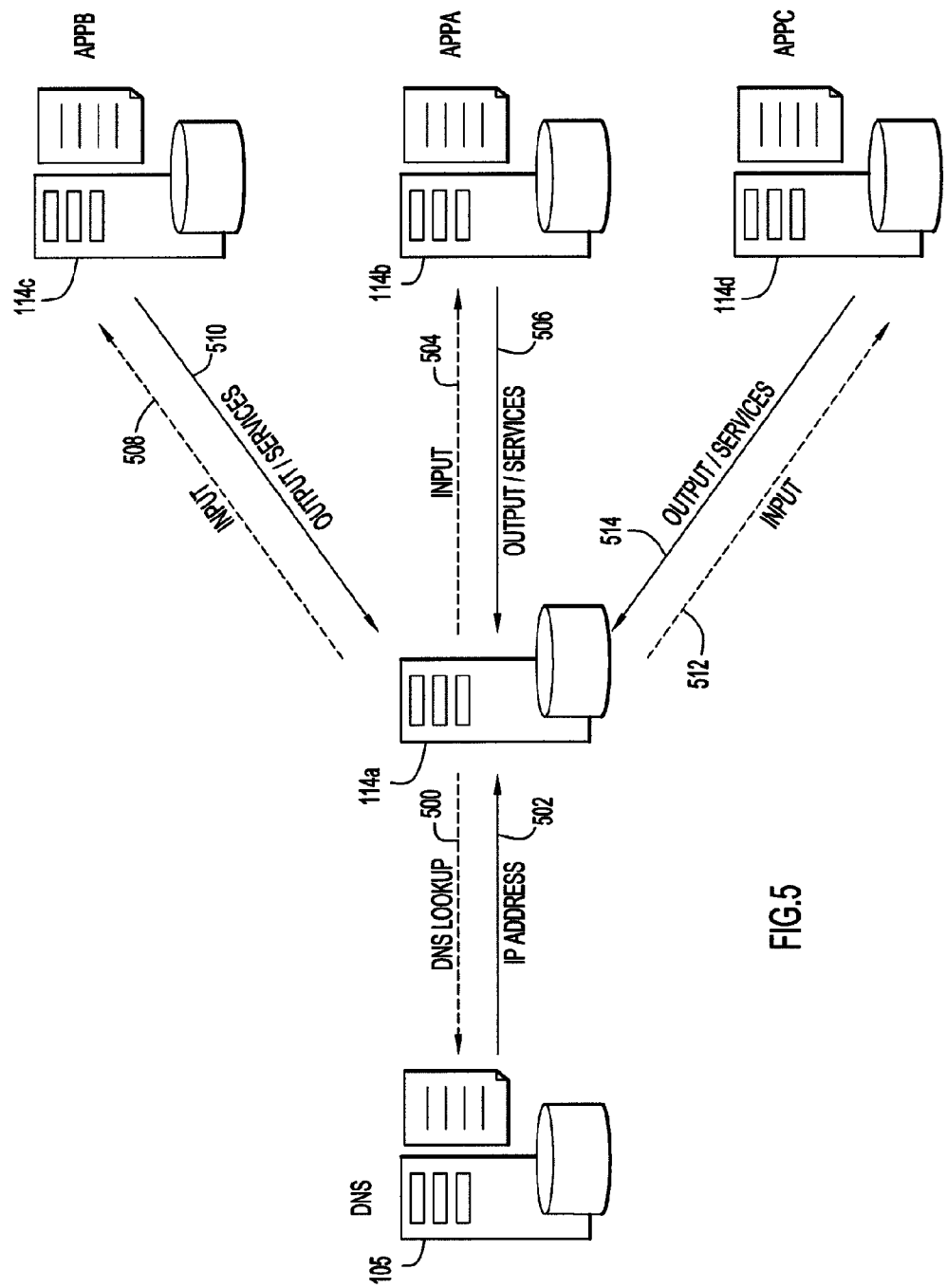
FIG. 5 is a flow diagram illustrating execution of several example applications distributed across a plurality of host systems according to an embodiment.

Operation of a present embodiment to execute applications distributed across host systems with pipelining of data between the applications is illustrated, by way of example, in FIG. 5. Initially, host systems 114*a*, 114*b*, 114*c*, and 114*d* are each substantially similar to host system 114 described above, while DNS system 105 is substantially similar to the DNS system described above. Host systems 114*a*, 114*b*, 114*c*, and 114*d* may include the same or different operating systems 205 (FIG. 2), while host systems 114*a*, 114*b*, 114*c*, 114*d* and DNS system 105 are preferably coupled by a network (not shown in FIG. 5). Host system 114*a* may include the shell of a present embodiment, and invoke one or more applications in response to commands. DNS system 105 performs the name resolution, while host systems 114*b*, 114*c*, 114*d* each contain and execute a corresponding application (e.g., host system 114*b* contains appA, host system 114*c* contains appB, and host system 114*d* contains appC as viewed in FIG. 5).

In particular, an invocation event occurs (e.g., user entered command, instruction or command from a program, etc.) on host system 114*a*. By way of example, the following path entries may reside in configuration file 215 (FIG. 2) of host system 114*a*:

path=/bin;/usr/bin;appA.mydomainA.com, path=/bin;/usr/bin;appB.mydomainB.com, path=/bin;/usr/bin;appC.mydomainC.com, while the following commands may be entered at a shell prompt:

nsh>appA|appB|appC nsh>Hello ABC.

The entered commands facilitate execution of applications by the corresponding names of the executable files (e.g., "appA", "appB", and "appC"), and are processed by distributed processing controller module 210 (e.g., via host system 114*a*). The commands further indicate pipelining input and output between the applications (e.g., via the "|" symbol). The distributed processing controller module (e.g., via host system 114*a*) locates and executes applications "appA", "appB", and "appC", while passing input data from the invocation event to the initial application ("appA"), and passing standard input (stdin), output (stdout) and error (stderr) data generated by the application executions between the applications. Once the applications have been executed, a final output response (e.g., "ABC") is provided.

The distributed processing controller module (e.g., via host system 114*a*) ascertains information from configuration file 215 (FIG. 2) including the path locations to search for the initial application (e.g., "appA"). The distributed processing controller module further searches (e.g., via host system 114a) the path locations specified by the configuration file in the order of priority determined by the structure in the configuration file (e.g., typically implicit in the sequence of locations, optionally specified in priority by a separate data value, etc.). Example paths may include /bin;/usr/bin;appA.mydomainA.com, /bin;/usr/bin;appB.mydomainB.com, and bin;/usr/bin;appC.mydomainC.com.

When the path locations do not use a qualified DNS name (e.g., "/bin", "/usr/bin"), the distributed processing controller module (e.g., via host system 114a) searches the local directory structure of storage devices of, or mounted to, the operating system of host system 114a for the initial application. If the executable file for the application (e.g., "appA") is found in the directory structure of the storage devices in accordance with the paths (e.g., "/bin", "/usr/bin/myapp"), a child process is spawned on the local operating system to execute the initial application. In this case, the input data (e.g., "input") is supplied to the standard input (e.g., stdin) of the child process (or application). A response is provided to the distributed processing controller module from the child process.

With respect to the example of FIG. 5, the distributed processing controller module encounters a qualified DNS name (e.g., "appA.mydomain.com") during the search for the initial application (e.g., "appA") through the path entries in order of priority in the configuration file, and a DNS lookup is performed by the configured DNS service or DNS system 105 at flow 500. DNS system 105 provides a Domain Name Service (DNS) that associates the qualified names (e.g., "appA.mydomain.com", "appB.mydomain.com", "appC.mydomain.com") with the Internet Protocol (IP) addresses assigned to the operating systems on host systems 114b, 114c, 114d. The IP address corresponding to the qualified name is returned at flow 502. The distributed processing controller module (e.g., via host system 114a) sends a request and input data to host system 114b based on the returned IP address at flow 504. Process manager module 220 (FIG. 2) of host system 114b receives and processes the request (e.g., including an identifier (e.g., name, etc.) for the desired application), and initiates (or forks) a process for the remote distributed processing controller module (e.g., via remote host system 114b) to determine the location of and execute the application. The application is executed in substantially the same manner described above for executing a local application, where search path entries are analyzed to determine the location of the application, and a process is initiated to execute the application locally on host system 114b. In this case, the input data received from host system 114a to execute the application (e.g., "appA") is supplied to the standard input (e.g., stdin) of the child process (or application). A response including the output and error information (e.g., stdout and stderr) from the application is provided from host system 114b to host system 114a at flow 506. Services (e.g., encryption, compression, etc.) may further be performed on the resulting data from host system 114b at flow 506.

Once the data is received at host system 114a, the data may be pipelined or directed for use with the subsequent application to be executed (e.g., "appB"). The subsequent application may be executed in substantially the same manner described above. In particular, the distributed processing controller module (e.g., via host system 114a) ascertains information from configuration file 215 (FIG. 2) including the path locations to search for the subsequent application (e.g., "appB"). The distributed processing controller module (e.g., via host system 114a) searches the path locations specified by the configuration file in the order of priority determined by the structure in the configuration file (e.g., typically implicit in the sequence of locations, optionally specified in priority by a separate data value, etc.).

When the path locations do not use a qualified DNS name (e.g., "/bin", "/usr/bin"), the distributed processing controller module searches the local directory structure of storage devices of, or mounted to, the operating system of host system 114a for the subsequent application. If the executable file of the application (e.g., "appB") is found in the directory structure of the storage devices in accordance with the paths, a child process is spawned on the local operating system to execute the initial application. In this case, the input data (e.g., data from the execution of "appA") is supplied to the standard input (e.g., stdin) of the child process (or application). A response is provided to the distributed processing controller module from the child process.

With respect to the example of FIG. 5, the distributed processing controller module encounters a qualified DNS name (e.g., "appB.mydomain.com") during the search for the application (e.g., "appB") through the path entries in order of priority in the configuration file, and a DNS lookup is performed by the configured DNS service or DNS system 105 at flow 500. The IP address corresponding to the qualified name is returned at flow 502. The distributed processing controller module (e.g., via host system 114a) sends a request and input data to host system 114c based on the returned IP address at flow 508. Process manager module 220 (FIG. 2) of host system 114c receives and processes the request (e.g., including an identifier (e.g., name, etc.) for the desired application), and initiates (or forks) a process for the remote distributed processing controller module (e.g., via remote host system 114c) to determine the location of and execute the application in substantially the same manner described above. In this case, the input data received from host system 114a to execute the application (e.g., "appB") is supplied to the standard input (e.g., stdin) of the child process (or application). A response including the output and error information (e.g., stdout and stderr) from the application is provided from host system 114c to host system 114a at flow 510. Services (e.g., encryption, compression, etc.) may further be performed on the resulting data from host system 114c at flow 510.

Once the data is received at host system 114a, the data may be pipelined or directed for use with the next application to be executed (e.g., "appC"). The subsequent application may be executed in substantially the same manner described above. In particular, the distributed processing controller module (e.g., via host system 114a) ascertains information from configuration file 215 (FIG. 2) including the path locations to search for the subsequent application (e.g., "appC"). The distributed processing controller module (e.g., via host system 114a) searches the path locations specified by the configuration file in the order of priority determined by the structure in the configuration file (e.g., typically implicit in the sequence of locations, optionally specified in priority by a separate data value, etc.).

When the path locations do not use a qualified DNS name (e.g., "/bin", "/usr/bin"), the distributed processing controller module (e.g., via host system 114a) searches the local directory structure of storage devices of, or mounted to, the operating system of host system 114a for the subsequent application. If the executable file for the application (e.g., "appC") is found in the directory structure of the storage devices in accordance with the paths, a child process is spawned on the local operating system to execute the initial application. In this case, the input data (e.g., data from the execution of "appB") is supplied to the standard input (e.g., stdin) of the child process (or application). A response is provided to the distributed processing controller module from the child process.

With respect to the example of FIG. 5, the distributed processing controller module encounters a qualified DNS name (e.g., "appC.mydomain.com") during the search for the application (e.g., "appC") through the path entries in order of priority in the configuration file, and a DNS lookup is performed by the configured DNS service or DNS system 105 at flow 500. The IP address corresponding to the qualified name is returned at flow 502. The distributed processing controller module (e.g., via host system 114*a*) sends a request and input data to host system 114*d* based on the returned IP address at flow 512. Process manager module 220 (FIG. 2) of host system 114*d* receives and processes the request (e.g., including an identifier (e.g., name, etc.) for the desired application), and initiates (or forks) a process for the remote distributed processing controller module (e.g., via remote host system 114*d*) to determine the location of and execute the application in substantially the same manner described above. In this case, the input data received from host system 114*a* to execute the application (e.g., "appC") is supplied to the standard input (e.g., stdin) of the child process (or application). A response including the output and error information (e.g., stdout and stderr) from the application is provided from host system 114*d* to host system 114*a* at flow 514. Services (e.g., encryption, compression, etc.) may further be performed on the resulting data from host system 114*d* at flow 514. The resulting data from the execution of the final application of the example command (e.g., "appC") is provided as the output.

It will be appreciated that the embodiments described above and illustrated in the drawings represent only a few of the many ways of implementing embodiments for execution of applications distributed across a plurality of computing devices.

The topology of the present embodiments may include any number of computer or other processing systems (e.g., host systems, DNS or other server systems, etc.) arranged in any desired fashion, where these embodiments may be applied to any desired type of computing environment (e.g., cloud computing, client-server, network computing, etc.). The computer or other processing systems (e.g., host systems, DNS or other server systems, etc.) employed by these embodiments may be implemented by any number of any personal or other type of computer or processing system (e.g., IBM-compatible, APPLE, laptop, tablets, etc.), and may include any commercially available operating system and any commercially available or custom software (e.g., browser software, communications software, server software, distributed processing controller module, process manager module, DNS resolution module, pluggable service modules, etc.). These systems may include any types of monitors and input devices (e.g., keyboard, mouse, voice recognition, touch screen, etc.) to enter and/or view information. In addition, the host systems may be implemented by any personal or other type of computer or processing device (e.g., laptop, notebook, personal or other computer system, personal digital assistant (PDA), mobile/cellular telephones, mobile computing devices (e.g., pads, tablets, etc.)).

It is to be understood that the software (e.g., distributed processing controller module, process manager module, DNS resolution module, pluggable service modules, etc.) of the present embodiments may be implemented in any desired computer language and could be developed by one of ordinary skill in the computer arts based on the functional descriptions contained in the specification and flow charts and/or diagrams illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various host and DNS server systems, and/or any other intermediary processing devices. The software and/or algorithms described above and illustrated in the flow charts and/or diagrams may be modified in any manner that accomplishes the functions described herein. In addition, the functions in the flow charts and/or diagrams or description may be performed in any order that accomplishes a desired operation.

The software of the present embodiments (e.g., distributed processing controller module, process manager module, DNS resolution module, pluggable service modules, etc.) may be made available as a program product apparatus or device including a non-transitory recordable or computer usable or readable medium (e.g., magnetic or optical mediums, magneto-optic mediums, floppy diskettes, CD-ROM, DVD, memory devices, etc.) for use on stand-alone systems or systems connected by a network or other communications medium, and/or may be downloaded (e.g., in the form of carrier waves, packets, etc.) to systems via a network or other communications medium.

Further, the memories of the computer systems or devices of present embodiments may comprise read only memory (ROM), random access memory (RAM), magnetic disk storage media devices, optical storage media devices, flash memory devices, electrical, optical, or other physical/tangible memory storage devices. Thus, in general, the memory may comprise one or more computer readable storage media (e.g., a memory device) encoded with software or logic comprising computer executable instructions and, when executed (by the corresponding processor of the computer system or device), the software is operable to perform the operations described herein.

The communication network may be implemented by any number of any type of communications network (e.g., LAN, WAN, Internet, Intranet, VPN, etc.). The computer or other processing systems of these embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The present embodiments may employ any number of any conventional or other databases, data stores or storage structures (e.g., files, databases, data structures, data or other repositories, etc.) to store information. A database system may be included within or coupled to the computer or other processing systems. The database system and/or storage structure may be remote from or local to the computer or other processing systems, and may store any desired data.

The present embodiments may execute any quantity of any types of applications or other procedural instructions (e.g., computer programs, routines, macros, libraries, scripts, patches, etc.) distributed across one or more of any types of computing devices. Further, present embodiments may enable execution of any quantity of components of any types of applications or other procedural instructions (e.g., computer programs, routines, macros, libraries, scripts, patches, etc.) distributed across one or more of any types of computing devices.

The commands or instructions invoking execution of applications may originate from within code (e.g., programs, scripts, macros, etc.), or be entered at a user interface of a shell. Input to the distributed processing interface may further be supplied from entirely programmatic sources (not user-initiated or user-involved), and may be provided by computing devices that have no external user interfaces, such as monitors and keyboards. The commands from the code, shell and programmatic sources may be processed in substantially the same manners described above to execute applications distributed across computing devices. The search path may be provided in any suitable manner (e.g., commands or instructions, within environment or other variables, entered at a user interface, etc.), be of any quantity, and include any format or quantity of locations. The locations may be prioritized within or external of the search path in any desired fashion (e.g., order specified within the search path, flag or variable, etc.). The locations (e.g., local and remote) may be specified within the search path in any desired fashion (e.g., directory paths or locations, URLs, network or other addresses, naming conventions, variable names or substitution, etc.). The search path may be indicated by any quantity of individual commands or entries stored in any fashion for utilization (e.g., configuration or other file or data structure, environment or other variables, etc.).

The functions described above are preferably performed at levels no higher than Layer 3 of the OSI model. However, any of the functions may be performed at any desired levels of the OSI model.

The locations where a desired application resides may be specified by any quantity of any suitable indicator (e.g., network or protocol address, identifier resolvable to a location, direct or indirect address scheme, etc.). The locations may represent any suitable entity at the application residence (e.g., remote computing device, operating system or other component, direct address or location of the desired application, etc.).

The service modules may include any desired services for data to (e.g., prior to execution of) and/or from (e.g., after execution of) an application (e.g., encryption, compression, encoding (e.g., XML), Quality of Service (QoS), transaction control, statistics, logging, debugging/tracing, load-balancing, fail-over, file transfer, dynamic DNS registration, policy enforcement, etc.). The requests for the services may be of any type or format, and may include any desired information (e.g., identifier of the service, input, output, error stream, etc.).

The requests for remote execution of a desired application may be of any type or format, and may include any desired information (e.g., identifier of the application, input, output, error stream, etc.). The application identifier may be of any type, format or length, and include any quantity of any type of alphanumeric or other characters or symbols. The host systems may initiate any quantity of any suitable processes or threads to handle execution of applications. Further, data between applications may be pipelined in any suitable fashion (e.g., output of one or more applications may be applied to the input of one or more other applications, the output of one or more applications may be processed in any fashion (e.g., services, combined, etc.) for transfer to the input of one or more other applications, etc.).

The rules or policies of the policy manager may be of any desired form, and include any desired criteria for controlling execution and/or services for applications. The policy manager may provide workload management policies based on any external policy determination criteria (e.g., capacity, latency, cost, security, resiliency, regulatory, time of day, sequence of operations, etc.). The shell may provide any suitable user interface to receive commands (e.g., GUI, command line prompts, menu screens, etc.). Present embodiments may be utilized to execute any applications or other procedural instructions distributed across any computing systems, devices, and/or operating systems.

One or more computing devices (e.g., host systems, etc.) of present embodiments may be virtual, where the operating system and associated devices are all actually software representations of theoretical physical computing systems and devices. Similarly, the network may be a virtual network that is a logical construct of a network operating system software configuration on any type of physical infrastructure, and may be entirely a virtual representation of a network between two virtual computing devices on the same physical machine where no traversal of a physical network takes place to satisfy remote network operations between the two operating systems.

It will be understood that the terms "comprises", "comprising", "includes", "including", "has", "have", "having", "with" and the like, when used in this specification and the claims, specify the presence of stated features, but do not preclude the presence or addition of one or more other features.

From the foregoing description, it will be appreciated that the techniques disclosed herein make available novel embodiments for execution of applications distributed across a plurality of computing devices, wherein present embodiments enable execution of various applications distributed locally and remotely from the location of the application invocation, and across a plurality of computing devices.

Having described example embodiments of a new and improved technique for executing applications distributed across a plurality of computing devices, it is believed that other modifications, variations and changes will be suggested to those skilled in the art in view of the teachings set forth herein. It is therefore to be understood that all such variations, modifications and changes are believed to fall within the scope as defined by the appended claims.

What is claimed is:

1. A method comprising:
    detecting on a computing device an invocation event facilitating execution of one or more applications, wherein the applications include at least one remote application each for execution on a corresponding remote computing device;
    examining a search path to determine locations for the one or more applications, wherein the search path includes at least one indicator each associated with a corresponding remote application and indicating a remote location for execution of the corresponding remote application;
    resolving each indicator associated with the at least one remote application to determine a remote location for execution of the corresponding remote application; and
    enabling execution of the one or more applications at the determined locations, wherein each remote application is executed on the corresponding remote computing device at the corresponding remote location.

2. The method of claim 1, wherein resolving each indicator associated with the at least one remote application includes employing a Domain Name Service (DNS) to determine an address for the remote location indicated by that indicator.

3. The method of claim 1, further including
identifying one or more applications resident on the computing device and registering the identified applications with a Domain Name Service (DNS) to associate the identified applications with the location of the computing device.

4. The method of claim 1, wherein detecting the invocation event includes receiving a command from at least one of program code and a shell.

5. The method of claim 4, wherein enabling execution of the one or more applications includes:
selectively applying services to data associated with execution of the applications, wherein the services are specified by the command.

6. The method of claim 1, wherein enabling execution of the one or more applications includes:
directing data resulting from execution of one or more of the applications to at least one other application.

7. The method of claim 1, further including:
enabling execution of a local application of the computing device in response to a request from a remote computing device detecting an invocation event facilitating execution of that local application.

8. The method of claim 1, wherein the computing device and one or more of the remote computing devices include different operating systems.

9. A system comprising:
at least one processor configured to:
detect an invocation event on a computing device facilitating execution of one or more applications, wherein the applications include at least one remote application each for execution on a corresponding remote computing device;
examine a search path to determine locations for the one or more applications, wherein the search path includes at least one indicator each associated with a corresponding remote application and indicating a remote location for execution of the corresponding remote application;
resolve each indicator associated with the at least one remote application to determine a remote location for execution of the corresponding remote application; and
enable execution of the one or more applications at the determined locations, wherein each remote application is executed on the corresponding remote computing device at the corresponding remote location.

10. The system of claim 9, further including:
a Domain Name Service (DNS) system to determine an address for the remote location indicated by each indicator within the search path.

11. The system of claim 9, wherein the at least one processor is further configured to:
identify one or more applications and register the identified applications with a Domain Name Service (DNS) to associate the identified applications with the location of the computing device.

12. The system of claim 9, wherein the at least one processor is further configured to:
detect the invocation event by receiving a command from at least one of program code and a shell.

13. The system of claim 12, wherein the at least one processor is further configured to:
selectively apply services to data associated with execution of the applications, wherein the services are specified by the command.

14. The system of claim 9, wherein the at least one processor is further configured to:
direct data resulting from execution of one or more of the applications to at least one other application.

15. The system of claim 9, wherein the at least one processor is further configured to:
enable execution of a local application of the computing device in response to a request from a remote computing device detecting an invocation event facilitating execution of that local application.

16. The system of claim 9, wherein at least two of the computing devices include different operating systems.

17. One or more computer-readable storage media encoded with software comprising computer executable instructions and when the software is executed by a processor operable to:
detect on a computing device an invocation event facilitating execution of one or more applications, wherein the applications include at least one remote application each for execution on a corresponding remote computing device;
examine a search path to determine locations for the one or more applications, wherein the search path includes at least one indicator each associated with a corresponding remote application and indicating a remote location for execution of the corresponding remote application;
resolve each indicator associated with the at least one remote application to determine a remote location for execution of the corresponding remote application; and
enable execution of the one or more applications at the determined locations, wherein each remote application is executed on the corresponding remote computing device at the corresponding remote location.

18. The computer-readable media of claim 17, wherein the computer executable instructions further include computer executable instructions to:
employ a Domain Name Service (DNS) to determine an address for the remote location indicated by the at least one indicator in the search path.

19. The computer-readable media of claim 17, wherein the computer executable instructions further include computer executable instructions to:
identify one or more applications resident on the computing device and register the identified applications with a Domain Name Service (DNS) to associate the identified applications with the location of the computing device.

20. The computer-readable media of claim 17, wherein the computer executable instructions further include computer executable instructions to:
detect the invocation event by receiving a command from at least one of program code and a shell.

21. The computer-readable media of claim 20, wherein the computer executable instructions further include computer executable instructions to:
selectively apply services to data associated with execution of the applications, wherein the services are specified by the command.

22. The computer-readable media of claim 17, wherein the computer executable instructions further include computer executable instructions to:
direct data resulting from execution of one or more of the applications to at least one other application.

23. The computer-readable media of claim 17, wherein the computer executable instructions further include computer executable instructions to:
enable execution of a local application of the computing device in response to a request from a remote computing device detecting an invocation event facilitating execution of that local application.

24. The computer-readable media of claim 17, wherein the computing device and one or more of the remote computing devices include different operating systems.

25. The computer-readable media of claim 17, wherein one or more of the computing devices include a virtual computing device.

26. The method of claim 1, wherein one or more of the computing devices include a virtual computing device.

27. The system of claim 9, wherein the at least one processor is further configured to:
   implement one or more of the computing devices as a virtual computing device.

\* \* \* \* \*

UNITED STATES PATENT AND TRADEMARK OFFICE
CERTIFICATE OF CORRECTION

PATENT NO. : 8,424,026 B1  
APPLICATION NO. : 13/251538  
DATED : April 16, 2013  
INVENTOR(S) : John C. Cottrell Page 1 of 1

It is certified that error appears in the above-identified patent and that said Letters Patent is hereby corrected as shown below:

Title Page, below Item (58), please add:
-- (65) Prior Publication Data, US 2013/0086594 A1, April 4, 2013 --.

Signed and Sealed this  
Second Day of July, 2013

Teresa Stanek Rea  
*Acting Director of the United States Patent and Trademark Office*